United States Patent
Fujishiro et al.

(10) Patent No.: US 6,661,480 B2
(45) Date of Patent: Dec. 9, 2003

(54) LIQUID CRYSTAL DISPLAY AND LIGHT SOURCE DEVICE USED FOR THE SAME

(75) Inventors: Fumihiko Fujishiro, Tokyo (JP); Tsutomu Kanatsu, Tokyo (JP); Fumio Hasegawa, Tokyo (JP); Shin-Ichirou Ono, Tokyo (JP); Hirokazu Fukuyoshi, Tokyo (JP)

(73) Assignee: NEC LCD Technologies, Ltd., Kawasaki (JP)

( * ) Notice: Subject to any disclaimer, the term of this patent is extended or adjusted under 35 U.S.C. 154(b) by 0 days.

(21) Appl. No.: 10/300,574

(22) Filed: Nov. 21, 2002

(65) Prior Publication Data

US 2003/0095216 A1 May 22, 2003

Related U.S. Application Data

(62) Division of application No. 09/805,139, filed on Mar. 14, 2001.

(30) Foreign Application Priority Data

Mar. 15, 2000 (JP) ........................................ 2000-073040

(51) Int. Cl.[7] .................... G02F 1/1335; G02F 1/1333; F21V 7/04
(52) U.S. Cl. ............................. 349/65; 349/63; 349/64; 349/58; 349/161; 362/31
(58) Field of Search ............................. 349/63–65, 58, 349/155, 161; 362/31

(56) References Cited

U.S. PATENT DOCUMENTS

| | | | | |
|---|---|---|---|---|
| 5,064,276 A | 11/1991 | Endo et al. | ..................... | 349/64 |
| 5,146,354 A | 9/1992 | Plesinger | ..................... | 349/59 |
| 5,299,038 A | 3/1994 | Hamada et al. | ............. | 349/161 |
| 6,333,772 B1 | 12/2001 | Mori et al. | .................. | 349/161 |
| 6,380,993 B2 * | 4/2002 | Maeda | ........................ | 349/63 |

FOREIGN PATENT DOCUMENTS

| | | |
|---|---|---|
| JP | 61-172181 | 8/1986 |
| JP | 7-14433 | 3/1995 |
| JP | 8-184827 | 7/1996 |
| JP | 9-160010 | 6/1997 |
| JP | 10-96898 | 4/1998 |
| JP | 11-119216 | 4/1999 |
| JP | 11-160688 | 6/1999 |
| JP | 11-223812 | 8/1999 |
| JP | 2000-029004 | 1/2000 |

* cited by examiner

*Primary Examiner*—Tarifur R. Chowdhury
(74) *Attorney, Agent, or Firm*—McGinn & Gibb, PLLC

(57) ABSTRACT

A light emission surface having a substantially single surface in a liquid crystal display 1 is designed so as to be opposite to a rear of a liquid crystal panel 2 or a rear of an optical member 5 through an air layer. Thus, it is possible to provide a liquid crystal display that can prevent a heat accumulation in a liquid crystal panel without any drop of brightness, and a light source device used in the liquid-crystal display.

6 Claims, 12 Drawing Sheets

100: RADIATION MEMBER
101: PENETRATION HOLE

100: RADIATION MEMBER
101a: PENETRATION HOLE
101b: PENETRATION HOLE

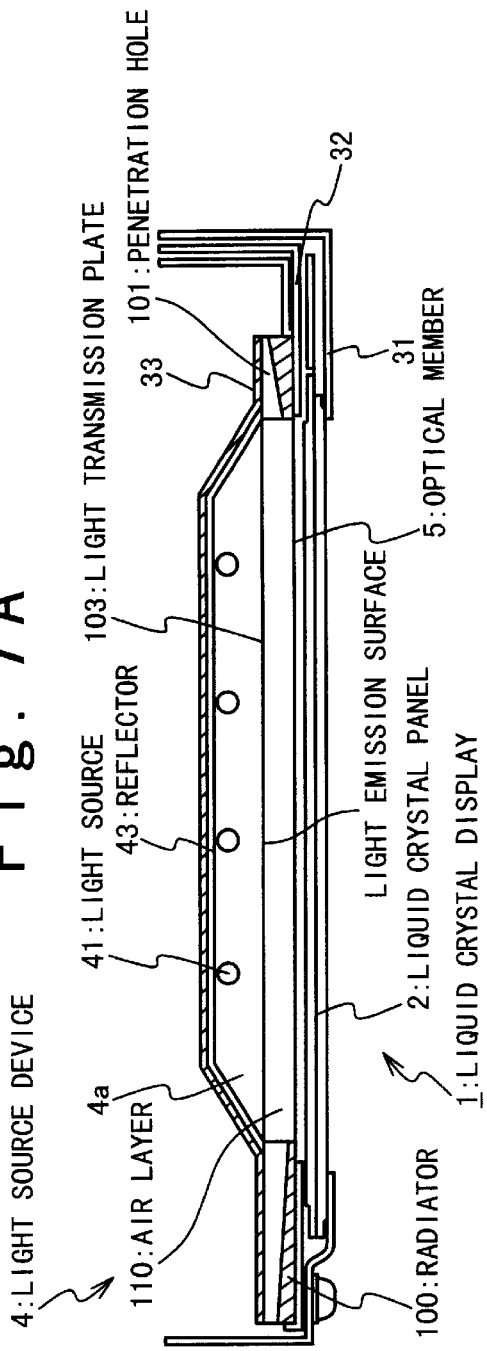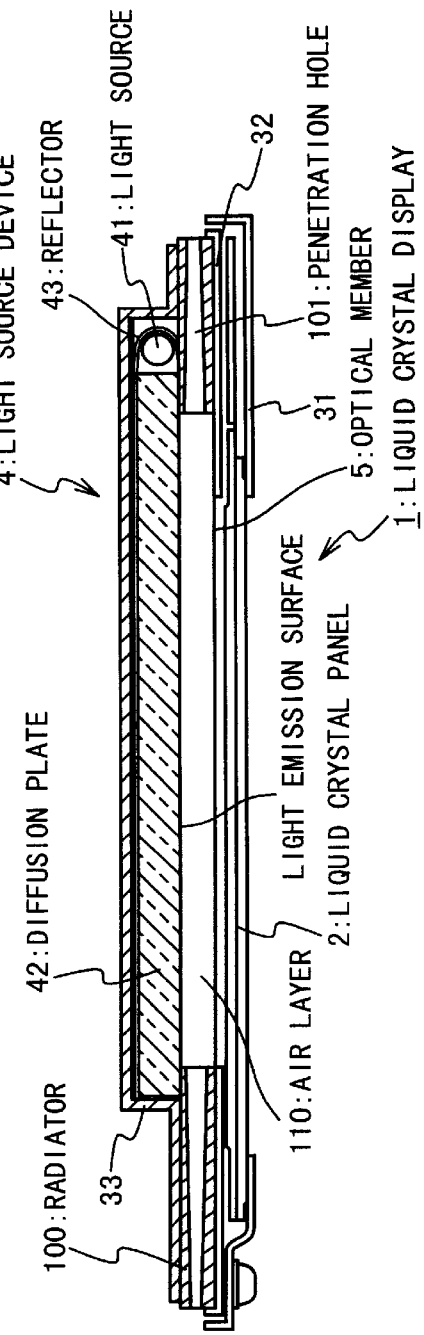

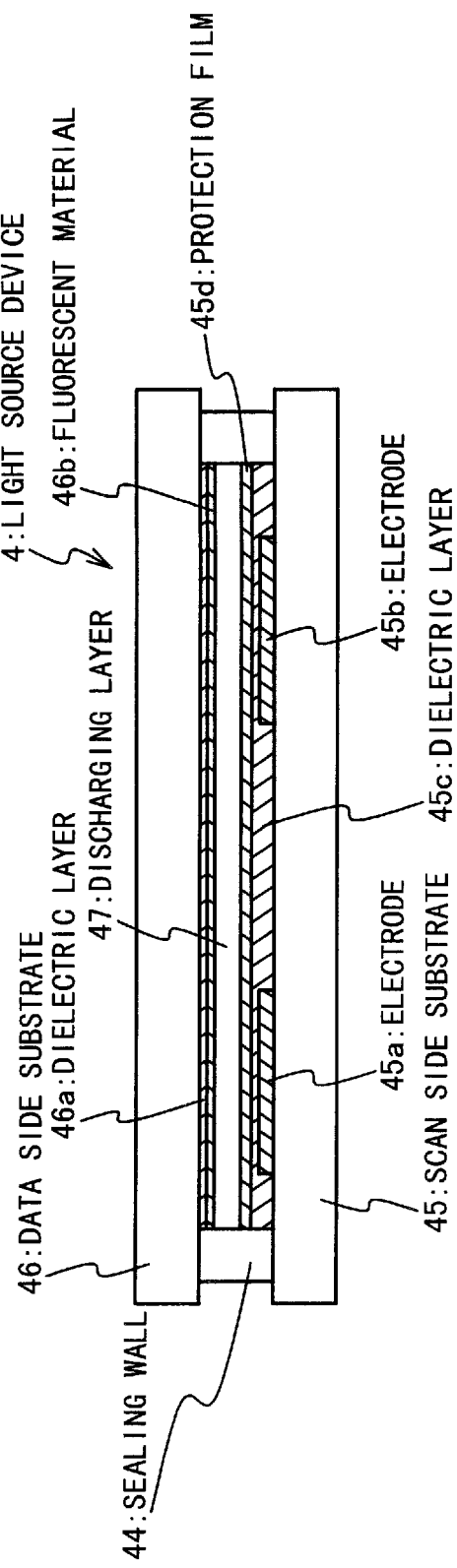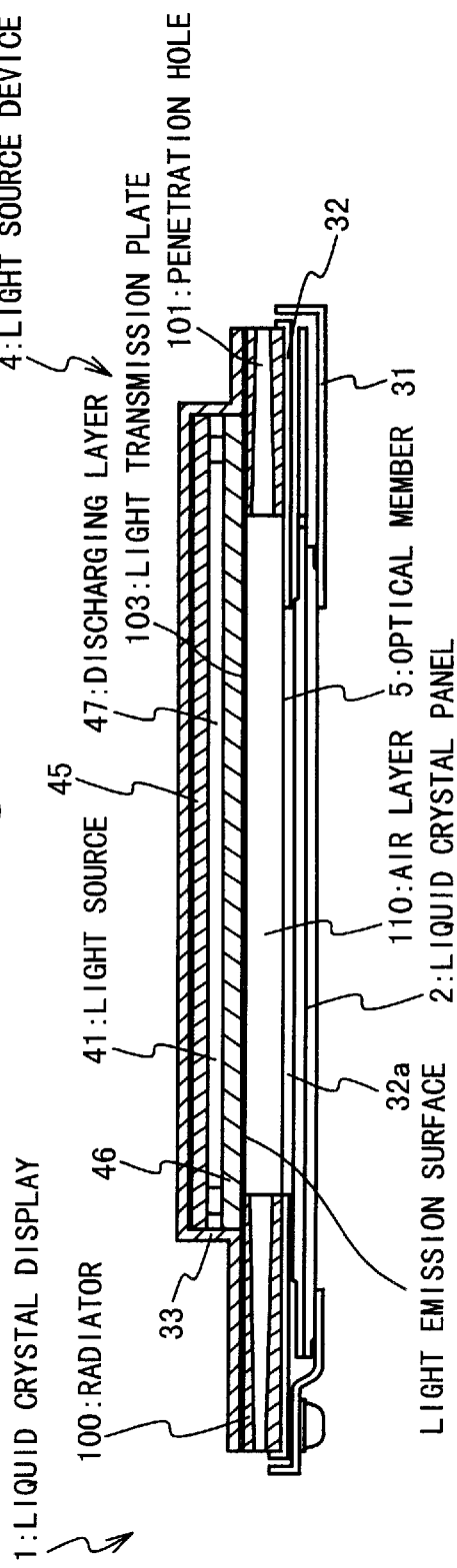

LIQUID CRYSTAL DISPLAY AND LIGHT SOURCE DEVICE USED FOR THE SAME

The present Application is a Divisional Application of U.S. patent application Ser. No. 09/805,139, filed on Mar. 14, 2001.

BACKGROUND OF THE INVENTION

1. Field of the Invention

The present invention relates to a liquid crystal display having a structure for preventing temperature rises of a liquid crystal panel and an optical member, and a light source device used for the same.

2. Description of the Related Art

In recent years, as a size of a liquid crystal display has been made larger, a desire has been strong for a liquid crystal display having a high brightness and a widely visible angle. In order to attain the liquid crystal display having the.high brightness, it is tried to increase a transmittivity of the liquid crystal panel and improve light usage efficiency. However, since they have limits, an approach of increasing a brightness of a back-light, namely a light source is typically tried.

Also, with regard to the attainment of the widely visible angle, there may be a case that the transmittivity of the liquid crystal panel is sacrificed. In order to compensate this demerit, it is effective to employ a technique for increasing the brightness of the light source.

Thus, the attainment of the higher brightness of the light source gives the sufficient effect to the high brightness and the widely visible angle of the liquid crystal display.

However, as mentioned above, the increase in the brightness of the light source requires an increase in an input power to a light source device. When an attention is paid to the light emission mechanism of the light source, it is typically known that several tens of percents of energy supplied to the light source device are lost as heat. That is, associated with the increase in the input power to the light source, the heat loss is increased, and a calorific value of the light source is increased.

As the calorific value of the light source is increased, a temperature of a liquid crystal panel mounted near the light source device is also raised. Since this liquid crystal panel depends on a temperature characteristic of itself, there may be a fear of a drop in a display quality as the liquid crystal display. Thus, such a liquid crystal display is desired that can attain the high brightness without any drop in the display quality of the liquid crystal panel.

For solving such a problem, a structure is employed in which a fan or a heat sink is mounted on a rear of a body of the liquid crystal display.

A conventional liquid crystal display and a light source device used for the same will be described below with reference to the attached drawings.

FIG. 1A is a perspective view showing a configuration of a conventional liquid crystal display. As shown in FIG. 1A, a liquid crystal display 1 is composed of a body 3 in which a liquid crystal panel 2, a light source device (not shown) and the like are built in, a radiator 7 mounted on a rear of the body 3, and a substrate part 8.

An opening portion 31a is positioned on a shield front 31 constituting a surface side of the body 3. A part of a surface of the liquid crystal panel 2 is exposed in the opening portion 31a, and the exposed portion forms a display surface of the liquid crystal display 1.

Also, the radiator 7 is directly mounted in a shield rear (not shown) constituting the rear side of the body 3. As the material for this shield rear, aluminum having high heat conduction and a lightweight are used in many cases.

In this way, the heat radiated from the light source device is released through the shield rear having the high heat radiate-ability to external portion.

Here, the surface of the liquid crystal panel 2 implies the display surface of the liquid crystal panel 2. Hereinafter, with regard to the description of surfaces besides the liquid crystal panel 2, a plane positioned in a direction similar to the surface of the liquid crystal panel 2 is noted as a surface, and a plane on a rear of the surface is noted as a rear.

The inner structure of the liquid crystal display will be described below with reference to FIG. 1B showing a section taken on the line A—A' of FIG. 1A. As shown in FIG. 1B, in the liquid crystal display 1, the liquid crystal panel 2 having a form of substantial plate, an optical member 5, such as a diffusion plate or the like, and a light source device 4 are substantially parallel and opposite to each other. The liquid crystal panel 2 is put between a shield front 31 and a shield center 32. The optical member 5 and the light source device 4 are put between the shield center 32 and a shield rear 33. Also, the radiator 7 and the substrate part 8 are mounted on the rear of the shield rear 33.

The structure of the light source device will be described below with reference to FIGS. 2A and 2B. As the structure of the light source device 4, there are mainly a straight fall type structure and a side light type structure. FIG. 2A is a section view showing a liquid crystal display having a light source device of the straight fall type structure, and FIG. 2B is a section view showing a liquid crystal display having a light source device of the side light type structure.

As shown in FIG. 2A, in the light source device 4 having the straight fall type structure, a reflector 43 is mounted inside a substantially dished portion (hereafter, referred to as "lamp house") of the shield rear 33. Near a reflector 43, a plurality of light sources 41 are mounted along the reflector 43 in parallel. Each of the plurality of the light sources 41 is cylindrical in shape. Also, the optical member 5, such as a diffusion plate or the like, is mounted on a light emission side of the light source device 4 having the straight fall type structure so as to cover the lamp house by keeping a predetermined distance from the light source 41, in order to avoid an occurrence of irregular brightness.

As shown in FIG. 2B, the light source device 4 having the side light type structure is composed of a light guide plate 42 having a form of substantial plate, a light source 41 that is mounted on one side of the light guide plate 42 and is cylindrical in shape, and a reflector 43 mounted so as to surround the light source 41 together with one side of the light guide plate 42.

The light guide plate 42 is made of acrylic having a high light transmittivity and the like. A light from the light source 41 is transmitted through the light guide plate 42, and radiated to the rear of the liquid crystal panel 2 from a region of an opening portion 32a of the shield center 32, in the surface of the light guide plate 42. Also, the gradation process in which a dot for adjusting the irregular brightness and the like are printed is performed on a plane opposite to a light emission surface in the light guide plate 42, namely, the rear of the light guide plate 42 opposite to the shield rear 33 through the reflector 43.

As the radiation structure of the conventional liquid crystal display, Japanese Laid Open Patent Application (JP-A-Showa, 61-172181) discloses a technique for radiating heat in a light source device by forming a ventilation port in a lamp house and sending air to the ventilation port, in a liquid crystal display having a light source device of a straight fall type structure.

Concretely, as shown in FIG. 3, a lamp house 4a is formed in a light source device 4 mounted on a rear side of a printed circuit board 34 equipping a liquid crystal panel 2. A light source 41 cylindrical in shape is mounted in this lamp house 4a. Also, ventilation ports 44 are formed on an upper side and a lower side of the lamp house 41.

FIG. 4 is a section view when the light source device 4 shown in FIG. 3 is applied to the liquid crystal display. As shown in FIG. 4, an optical member (diffusion plate) 5 is mounted so as to cover the lamp house 4a, and the liquid crystal panel 2 is mounted so as to be opposite to the light source 41 through the optical member 5.

As described above, it is obvious that if a brightness of a display surface in the liquid crystal display is improved, a heat radiation caused by the improvement of the brightness is induced from the light source device to the liquid crystal panel. Thus, an amount of the heat radiation from the light source device to the liquid crystal panel is set in such a range that the amount is equal to or greater than a level which does not drop the brightness of the conventional liquid crystal panel and equal to or less than a level which does not extremely drop a display function.

However, in the heat radiation structure of the liquid crystal display in which the radiator member is mounted on the rear of the body, there are only rooms for the improvement of the heat radiation, such as the employment of the material having the high heat conduction as the material constituting the body and the radiator member, or the increase of the surface area of the radiation member.

In the light source device having the straight fall type structure, especially in the above-mentioned light source device disclosed in Japanese Laid Open Patent Application (JP-A-Showa, 61-172181), penetration holes are formed in the lamp house so that the light source is directly cooled by the air flowing through the penetration holes. That is, the heat of the light source is positively escaped to external portion.

However, a brightness of a light source, such as a cold cathode tube or the like, is changed depending on a temperature. Its brightness is low at a room temperature (about 25° C.). A high brightness can be obtained at a condition that it is heated up to about 40-odd ° C.

Here, as disclosed in the Japanese Laid Open Patent Application (JP-A-Showa, 61-172181), if a size of the ventilation hole is made larger in order to improve the heat radiation efficiency, the temperature of the light source is excessively dropped, which may result in a drop in the brightness. Also, there may be a fear that a temperature rise time is made longer from a room temperature (at a time when the light source is turned on) to a suitable temperature (a maximum brightness).

Thus, the heat radiation efficiency must be reduced such that the temperature of the light source is not dropped beyond the necessity. As a result, the temperature of the liquid crystal panel rises. This results in the drop in the brightness of the liquid crystal panel.

As the related technique, Japanese Laid Open Patent Application (JP-A-Heisei, 8-184827) discloses an illuminating apparatus and a liquid crystal display using the same each of which includes an infrared ray reflection layer that is positioned so as to cover a light source and transmits a light from the light source from which an infrared ray is removed, and a fan apparatus for generating an air flow on a light transmission side of the infrared ray reflection layer and suppressing a heat conduction from the light source.

Japanese Laid Open Patent Application (JP-A-Heisei, 9-160010) discloses a liquid crystal display in which two light diffusion plates positioned separately from each other are mounted between a transmission type liquid crystal display and a bulb, and a portion between the two light diffusion plates is used as an adiabatic air layer.

Japanese Laid Open Patent Application (JP-A-Heisei, 10-96898) discloses a liquid crystal display in which a hollow ventilation member is mounted on an upper surface side and a lower surface side of a body of a back-light, and a fan is mounted near an end of the ventilation member.

Also, Japanese Laid Open Patent Application (JP-A-Heisei, 11-119216) discloses a liquid crystal display having a liquid crystal module in which a light source for emitting a back-light is mounted on a rear side of a liquid crystal panel. In this liquid crystal display, a heat radiation plate is mounted opposite to a substantially entire surface of a rear of the liquid crystal module and is also in contact with a vicinity of a portion opposite to the light source on the rear of the liquid crystal module.

Moreover, Japanese Laid Open Patent Application (JP-A-Heisei, 11-160688) discloses a liquid crystal display in which a liquid crystal panel is mounted within a housing, and a support member is formed on a base frame side for accommodating therein a back-light, and in order that this support member supports the liquid crystal panel on an inner surface side of the housing, a panel support surface of the support member has a plurality of protrusions so that it is in discontinuous contact with the liquid crystal panel.

SUMMARY OF THE INVENTION

The present invention is made for solving the above-mentioned problems. Therefore, an object of the present invention is to provide a liquid crystal display that protects a heat accumulation in a liquid crystal panel without any drop of brightness, and a light source device used in the liquid crystal display.

In order to attain this object, in a liquid crystal display according to a first aspect of the present invention, a light emission surface having a substantially single surface in a light source device is opposite to a rear of a liquid crystal panel or a rear of an optical member through an air layer formed by a spacing member.

Due to this configuration, the rears of the liquid crystal panel and the optical member, such as a diffusion plate and the like is not directly radiated the heat generated from the light source device. Thus, it is possible to prevent in advance the drops in the functions of the optical member and the liquid crystal panel. Especially, in the liquid crystal display using the light source device having the straight fall type structure, a light transmission plate is mounted opposite to the rear of the optical member, and it constitutes a light emission surface of a plane light source, and thereby a lamp house is sealed.

The object of the present invention is to increase a brightness of the light source and a brightness of the liquid crystal panel. Thus, it is necessary to carry out a control so that in order to increase the brightness of the light source, the light source is not cooled beyond the necessity, and a temperature of the liquid crystal panel is not raised by the heat from the light source. That is, the light source is shielded from the air layer by the light emission surface, and it is not directly cooled. Thus, the air layer directly cools the liquid crystal panel.

The above-mentioned configuration can control the temperature of the light source and the temperature of the liquid crystal panel so as to increase the brightness of the liquid crystal display and improve the maintenance of a display quality.

Under the object similar to the above object, a liquid crystal display according to the first aspect of the present invention may be comprised such that a light source device is mounted opposite to a light emission target through a diffusion plate. In this liquid crystal display, an air layer is mounted between the light source device and the diffusion plate, and a light emission surface having a substantially single surface is mounted on a light emission target side of the light source device.

Due to this configuration, the light source device has the light emission surface, and the air layer formed by the spacing member is formed between the light emission surface and the optical member. Thus, the radiation heat of the light source device is not directly emitted from the light source device to the optical member or the liquid crystal panel. Thereby, the radiation heat is suppressed by the air layer. Hence, it is possible to prevent in advance the drops in the functions of the liquid crystal panel and the optical member.

In the liquid crystal display according to the first aspect of the present invention, the air layer can be configured such that the heat radiation member as a spacing member is put between the light emission surface of the light source device and the diffusion plate.

Due to this configuration, the opening portion of the heat radiation member, the light emission surface of the light source device and the rear surface of the optical member constitute the air layer. This air layer suppresses the heat radiation from the light source device to the liquid crystal panel or the optical member. Also, even if a calorific value is increased in conjunction with a larger size of a light source device, a capacity of the air layer can be made larger in conjunction with the increase.

The liquid crystal display according to the first aspect of the present invention can be designed such that the light source device has a light emission surface having a predetermined transmittivity on a light emission side of the light source device having a straight fall type constructor.

Due to this configuration, the light emission surface serves as a part constituting the air layer. A distance between the light source and the optical member (diffusion plate) can be reserved to thereby suppress the irregular brightness. Here, the predetermined transmittivity can be a transmittivity at which a light quantity of the light source is not extremely lost and the light emission surface itself does not have the function of the optical member such as the diffusion plate and the like.

In the liquid crystal display according to the first aspect of the present invention, the light source device can be constituted by a light source device having a side light type structure.

The liquid crystal display according to the first aspect of the present invention can be designed such that one or more penetration holes penetrating an inner circumference surface and an outer circumference surface are positioned in the heat radiation member.

Due to this configuration, the air flows through the air layer so that the air layer can be effectively cooled. Thus, it is possible to effectively radiate the heat accumulated in the air layer caused by the radiation heat from the light source device. Hence, the liquid crystal display can be properly operated.

The liquid crystal display according to the first aspect of the present invention can be designed such that the shape of the penetration hole is tapered. Due to this configuration, convection can be easily generated in the air layer so that the heat radiation can be performed further easily in the air layer.

The liquid crystal display according to the first aspect of the present invention can be designed such that the shape of the penetration hole is set in accordance with the flow route of the air. Due to this configuration, the shape of the penetration hole suitable for the easy inflow and outflow (convection) in the air layer is determined based on the direction in which the liquid crystal display is mounted. For example, the shapes of the penetration holes to be formed on upper and lower surfaces and right and left surfaces of the heat radiation member are respectively determined so as to enable the easy convection. Thus, the further effective heat radiation can be performed in the air layer.

The liquid crystal display according to the first aspect of the present invention can be designed such that one or more grooves penetrating an inner circumference surface and an outer circumference surface are formed in the heat radiation member.

Due to this configuration, the groove and the light emission surface of the light source device, or the groove and the rear of the optical member constitute the penetration hole. Accordingly, the heat radiation structure is configured for making the air flow into or flow out from the air layer.

The liquid crystal display according to the first aspect of the present invention can be designed such that the shape of the groove is tapered. Due to this configuration, the convection can be easily generated in the air layer so that the further effective heat radiation can be performed in the air layer.

The liquid crystal display according to the first aspect of the present invention can be designed such that the shape of the groove is determined in accordance with the flow route of the air. Due to this configuration, the shape of the penetration hole suitable for the easy inflow and outflow (convection) in the air layer is determined in accordance with the direction in which the liquid crystal display is mounted. For example, the shapes of the penetration holes to be formed on upper and lower surfaces and right and left surfaces of the heat radiation member are respectively determined so as to enable the easy convection. Thus, the further effective heat radiation can be performed in the air layer.

The liquid crystal display according to the first aspect of the present invention can be designed such that the heat radiation member and the light source device are molded and integrated into a single unit. Due to this configuration, the number of parts as well as the number of assembling processes can be reduced to consequently reduce a manufacturing cost of the liquid crystal display.

Also, under the object similar to the above object, a light source device according to a second aspect of the present invention is designed such that a protrusion is positioned at a circumference edge of a light emission surface, and one or more penetration holes penetrating an inner circumference surface and an outer circumference surface are positioned in such a protrusion. Due to this configuration, an inner surface of the protrusion, a light emission surface of a light source device and an optical member constitute an air layer, and a penetration hole through which air can flow into or flow out from such the air layer can cool the air layer heated by the light source device.

The light source device according to the second aspect of the present invention can be designed such that the shape of the penetration hole is tapered. Due to this configuration, the convection can be easily generated in the air layer so that the further effective heat radiation can be done in the air layer.

The light source device according to the second aspect of the present invention can be designed such that the shape of the penetration hole is set in accordance with the flow route of the air. Due to this configuration, the shape of the penetration hole suitable for the easy inflow and outflow (convection) in the air layer is determined in accordance with the direction in which the liquid crystal display is mounted. For example, the shapes of the penetration holes to be formed on upper and lower surfaces and right and left surfaces of the heat radiation member are respectively determined so as to enable the easy convection. Thus, the further effective heat radiation can be performed in the air layer.

Also, under the object similar to the above object, a light source device according to a third aspect of the present invention is designed such that a protrusion is positioned at a circumference edge of a light emission surface, and one or more grooves penetrating an inner circumference surface and an outer circumference surface are positioned in this protrusion.

Due to this configuration, the groove and the light emission surface of the light source device, or the groove and a rear surface of an optical member constitute a penetration hole. Accordingly, the heat radiation structure is configured for making the air flow into or flow out from the air layer. Thus, the air flows into or flows out from the thus-formed penetration hole, and the heat is radiated from the air layer heated by the light source device. Hence, it is possible to protect the heat accumulation in the optical member and the liquid crystal panel.

The light source device according to the third aspect of the present invention can be designed such that the shape of the groove is tapered. Due to this configuration, the convection can be easily generated in the air layer so that the further effective heat radiation can be done in the air layer.

The light source device according to the third aspect of the present invention can be designed such that the shape of the groove is set in accordance with the flow route of the air. Due to this configuration, the shape of the penetration hole suitable for the easy inflow and outflow (convection) in the air layer is determined in accordance with the direction in which the liquid crystal display is mounted. For example, the shapes of the penetration holes to be formed on upper and lower surfaces and right and left surfaces of the heat radiation member are respectively determined so as to enable the easy convection. Thus, the further effective heat radiation can be performed in the air layer.

BRIEF DESCRIPTION OF THE DRAWINGS

FIG. 7A is a section view showing a structure of a liquid crystal display using a light source device having a straight fall type structure according to the first embodiment of the present invention;

FIG. 7B is a section view showing a structure of a liquid crystal display using a light source device having a side light type structure according to the first embodiment of the present invention;

FIG. 7C is a section view showing a structure of a liquid crystal display using a plane light source device according to the first embodiment of the present invention;

FIG. 7D is a section view showing a structure of a liquid crystal display having another plane light source device according to the first embodiment of the present invention;

DESCRIPTION OF THE PREFERRED EMBODIMENTS

Now, the configurations of a liquid crystal display according to embodiments of the present invention and a light source device used in the same will be described below with reference to the attached drawings.

First Embodiment

Figures 1A, 1B:
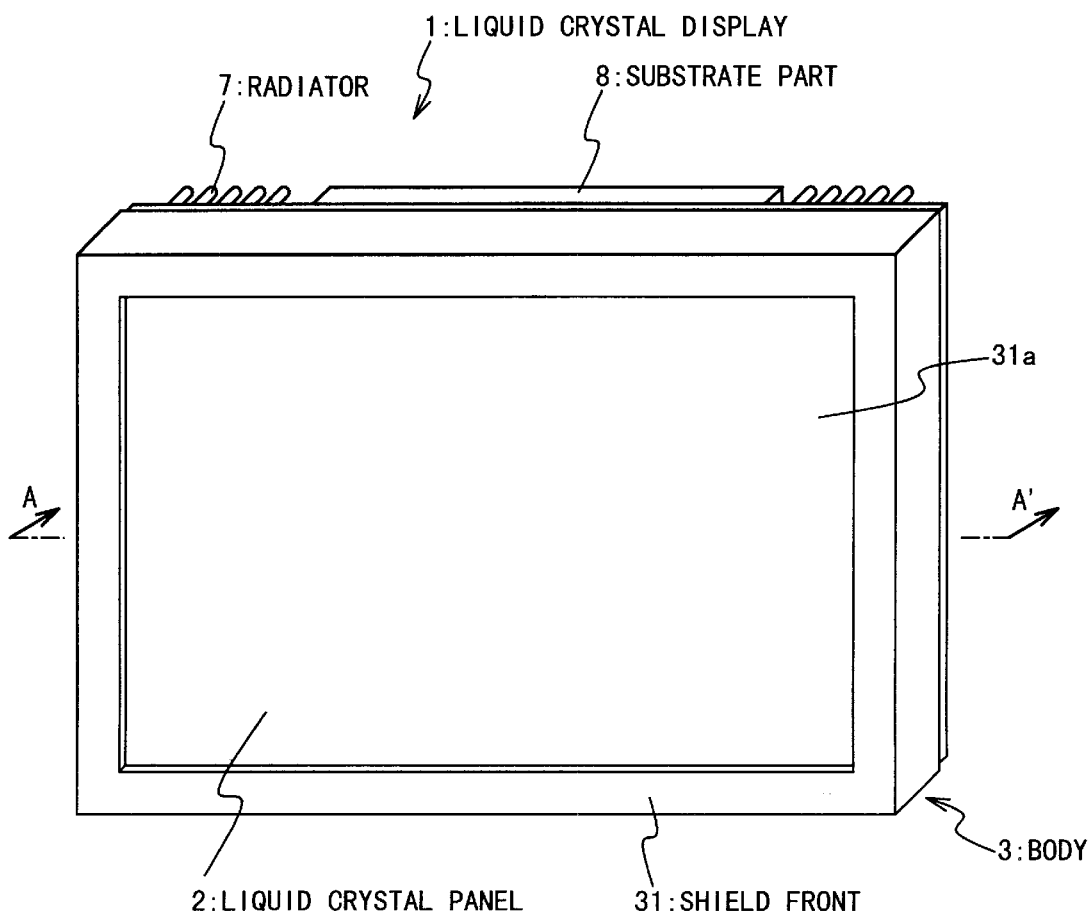
FIG. 1A is a perspective view showing a configuration of a conventional liquid crystal display.
FIG. 1B is a section view showing a configuration of a conventional liquid crystal display.
Figure 2A:
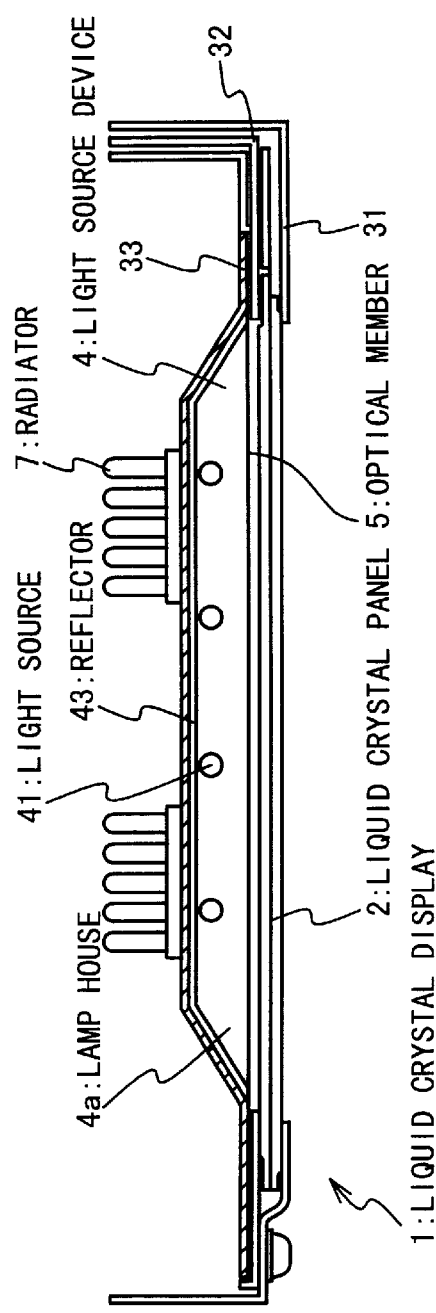
FIG. 2A is a section view showing a configuration of a conventional liquid crystal display having a light source device of a straight fall type structure.
Figure 2B:
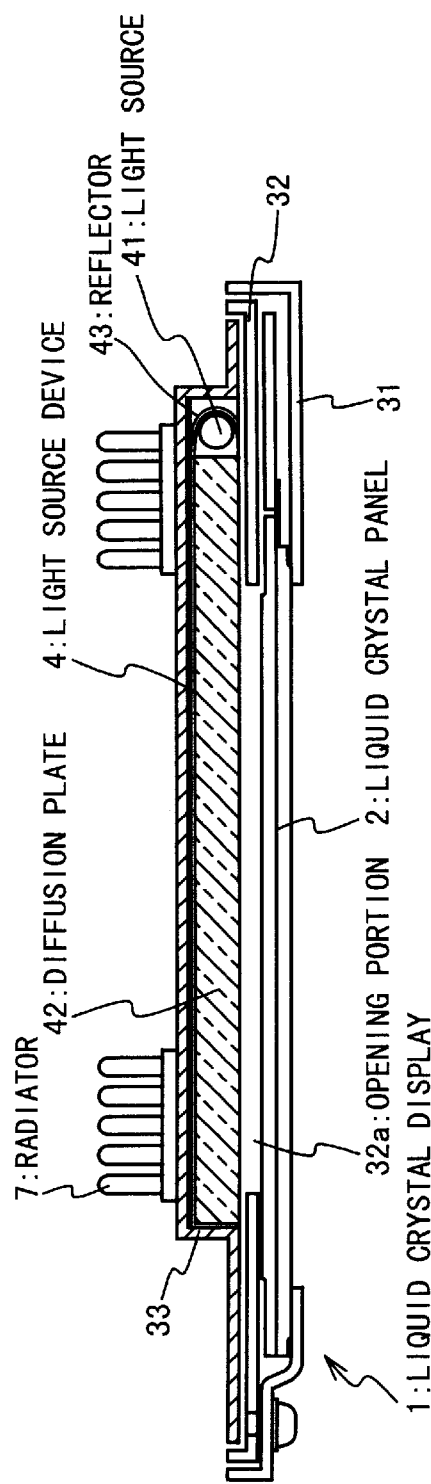
FIG. 2B is a section view showing a configuration of a conventional liquid crystal display having a light source device of a side light type structure.
Figure 3:
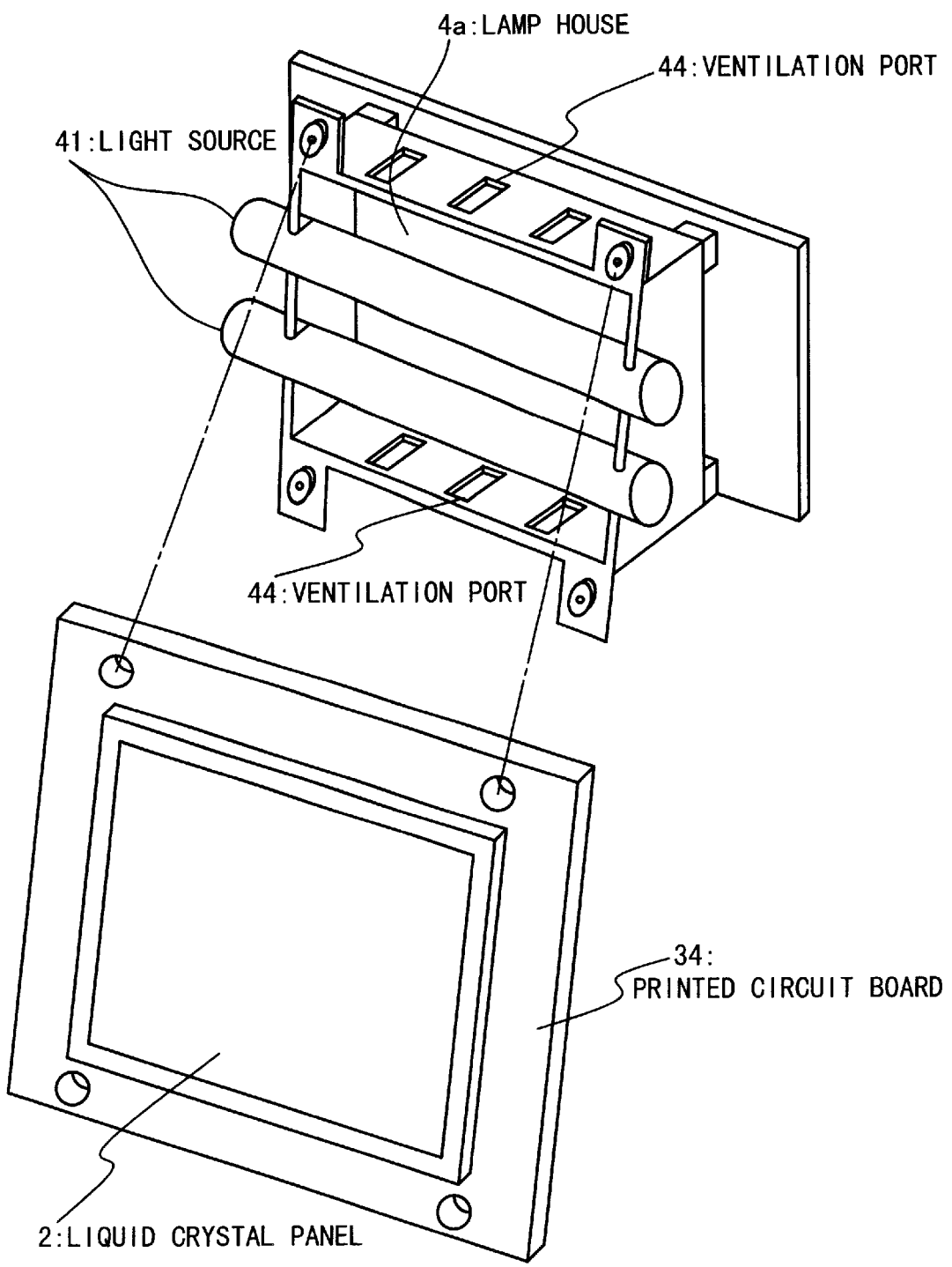
FIG. 3 is a perspective view showing a configuration of a conventional liquid crystal display.
Figure 4:
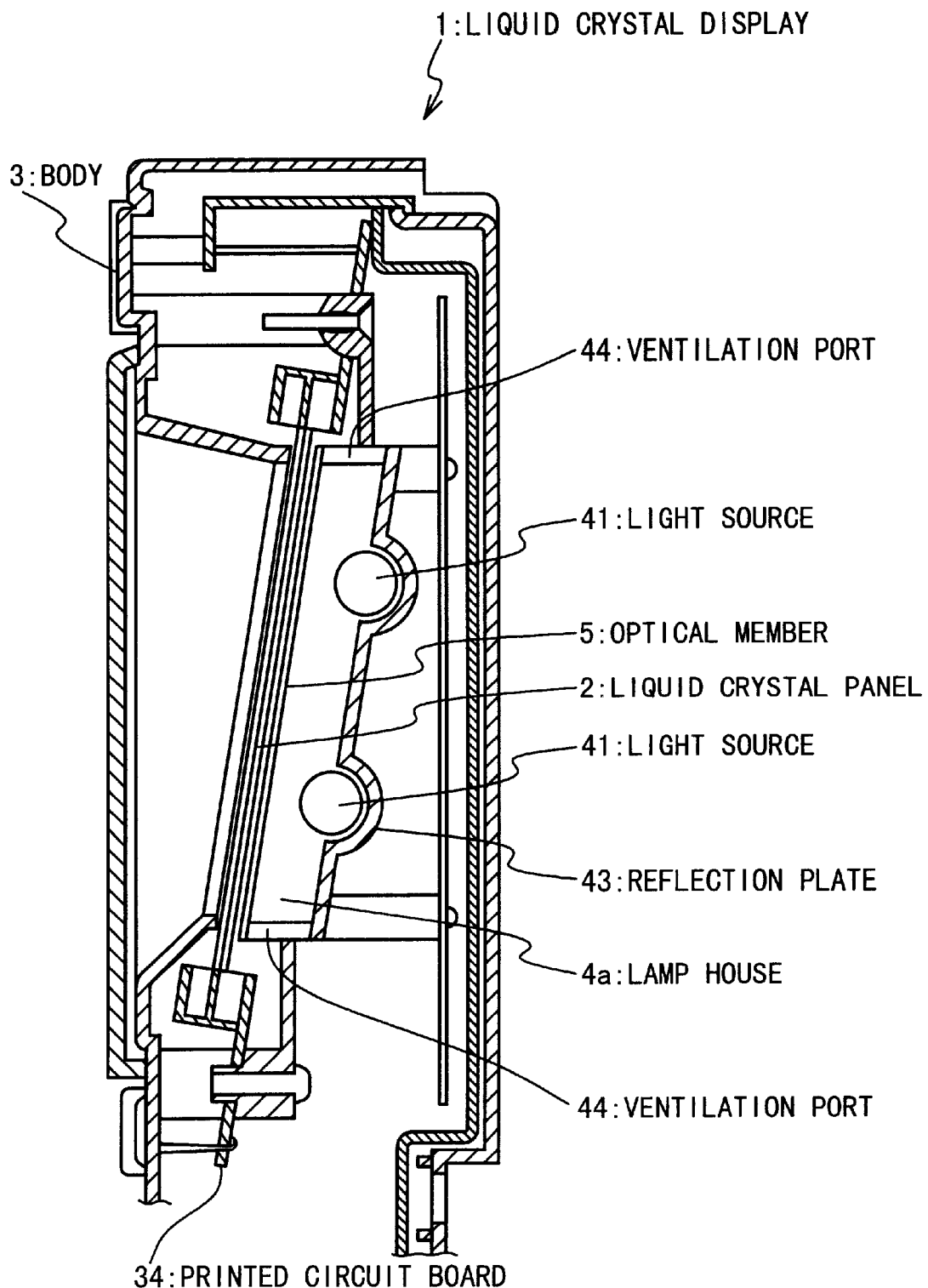
FIG. 4 is a section view showing a configuration of a conventional liquid crystal display.
Figure 5A:
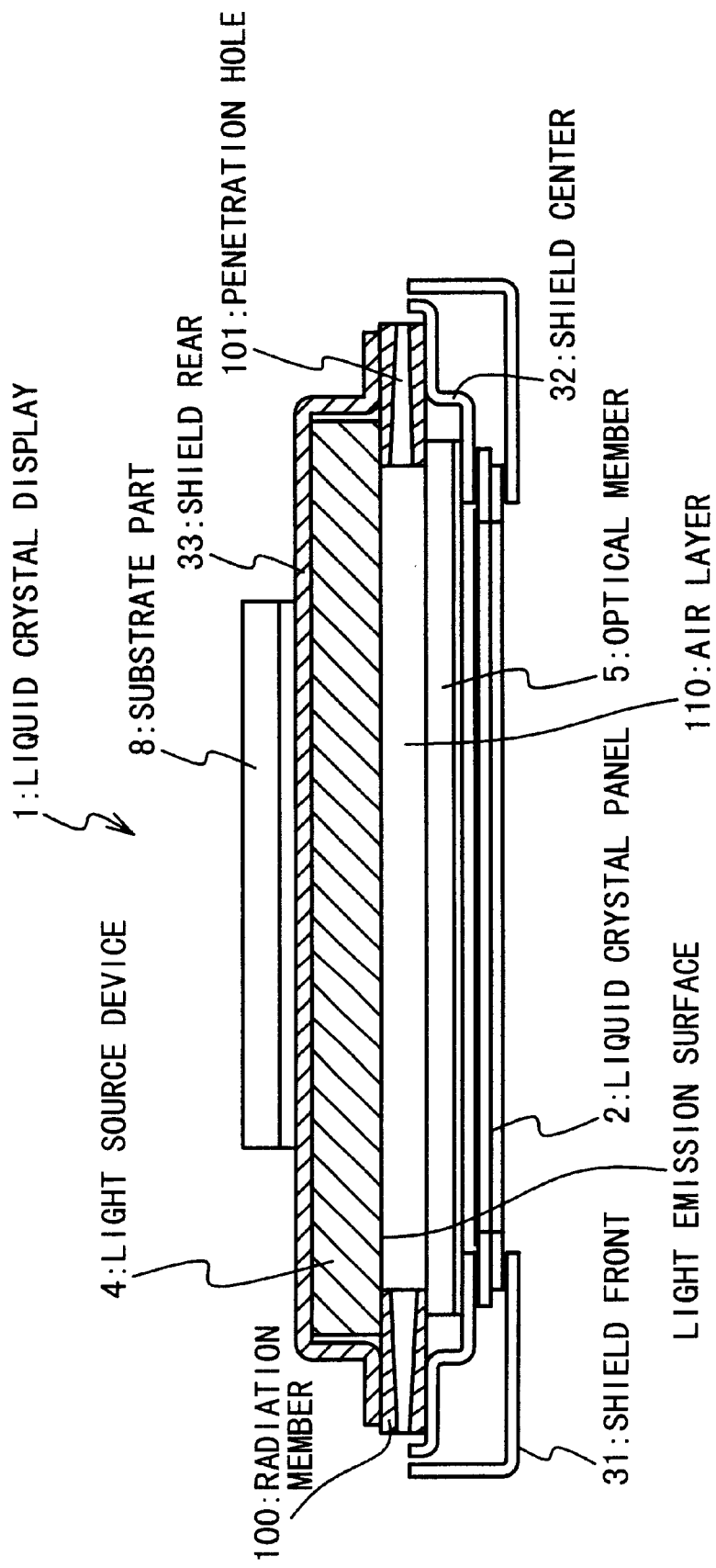
FIG. 5A is a section view showing a configuration of a liquid crystal display according to a first embodiment of the present invention.
Figure 5B:
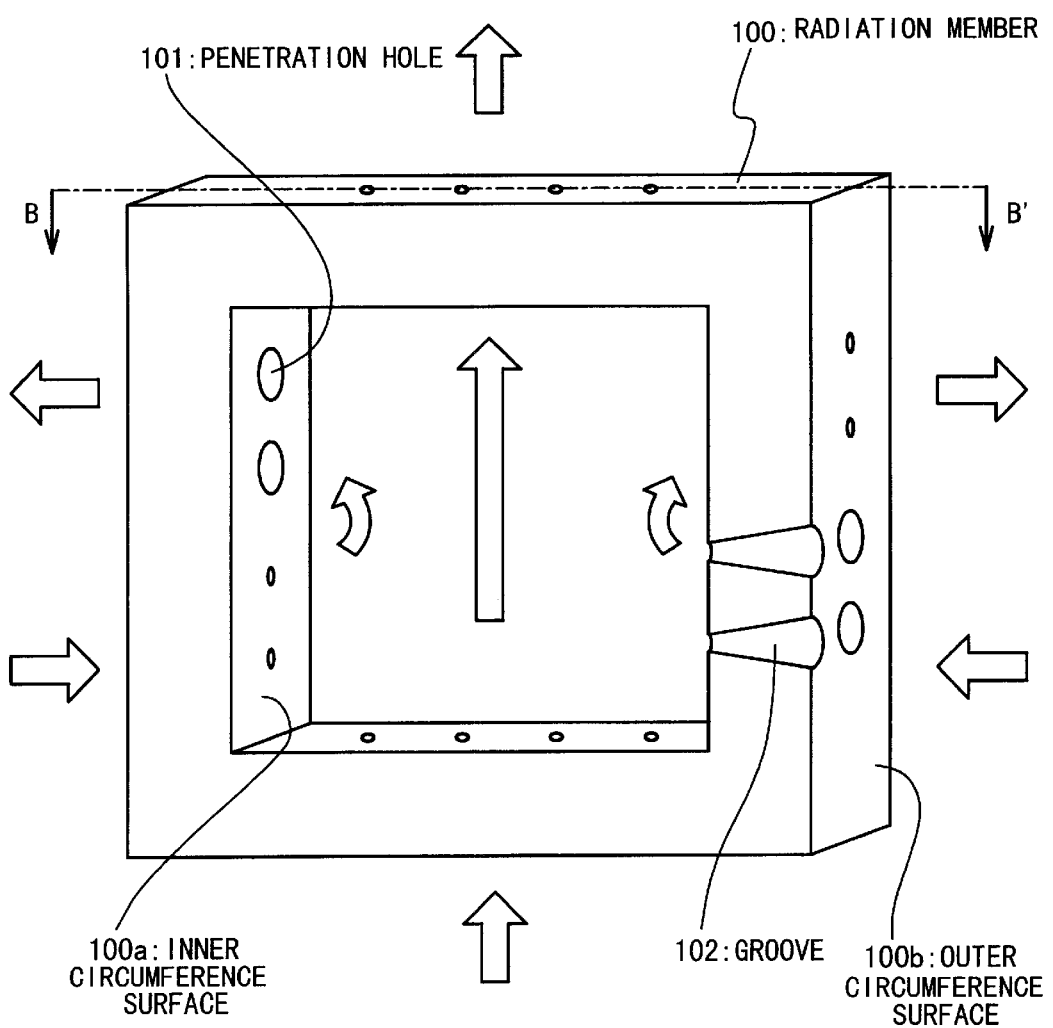
FIG. 5B is a perspective view showing a heat radiation member used in the liquid crystal display according to the first embodiment of the present invention.

FIGS. 5A is a section view showing the configuration of the liquid crystal display according to a first embodiment of the present invention. FIG. 5B is a perspective view showing a heat radiation member used in the liquid crystal display according to the first embodiment of the present invention.

As shown in FIG. 5A, a liquid crystal display 1 according to the first embodiment of the present invention is comprises a shield front 31, a shield center 32 and a shield rear 33 constituting a body of the liquid crystal display 1, and a liquid crystal panel 2 and a light source device 4 which are built in them.

Each of the shield front 31 and the shield center 32 is frame-shaped and has an opening portion. Specifically, the liquid crystal panel 2 that is substantially-plate-shaped is put between the shield front 31 and the shield center 32. Also, an optical member 5, such as a diffusion plate and the like, a heat radiation member 100, and the light source device 4 are put between the shield center 32 and the shield rear 33. The light source device 4 is mounted through a reflector (not shown) on an inner surface (surface) of the shield rear 33, and a substrate part 8 is mounted on an outer surface (rear) of the shield rear 33.

Moreover, the heat radiation member 100 put between the optical member 5 and the light source device 4 is formed by frame-shaped body and has an opening portion. One or more penetration holes 101 penetrating an inner circumference surface 100a and an outer circumference surface 100b are formed. Thus, an air layer 110 constituted by the inner circumference surface 100a of the heat radiation member 100 and a surface (light emission surface) of the light source device 4 is linked to an external portion of the body through the penetration holes 101.

Here, the inner circumference surface 100a of the heat radiation member 100 implies a surface on which an opening portion of the heat radiation member 100 is formed in a thickness direction, and the outer circumference surface 100b of the heat radiation member 100 implies a surface on which the outer circumference of the heat radiation member 100 is formed opposite to the inner circumference surface 100a. That is, when the heat radiation member 100 is mounted in the liquid crystal display 1, the side in contact with the optical member 5 and the shield center 32 is referred to as the surface, and the side in contact with the surface (light emission surface) of the light source device 4 and the shield rear 33 is referred to as the rear.

The structure of the heat radiation member 100 will be described below with reference to FIG. 5B.

As shown in FIG. 5B, the heat radiation member 100 is substantially-frame-shaped and has the opening portion. The penetration holes 101 penetrating the inner circumference surface 100a and the outer circumference surface 100b are formed in the heat radiation member 100.

Furthermore, grooves 102 for linking the inner circumference surface 100a and the outer circumference surface 100b to each other might be formed in the heat radiation member 100. In this configuration, penetration holes are formed by the grooves 102 and the shield rear 33 when the heat radiation member 100 is mounted in the liquid crystal display 1.

Each of the penetration holes 101 or each of the grooves 102 is tapered, and the directions in which the tapered shapes are formed are respectively determined. In detail, the directions in which the penetration holes 101 and the grooves 102 are formed are determined in order to create an air convection denoted by a bold arrow, in accordance with the positions of the grooves 102, the penetration holes 101 and the liquid crystal display 1.

Figure 6A:
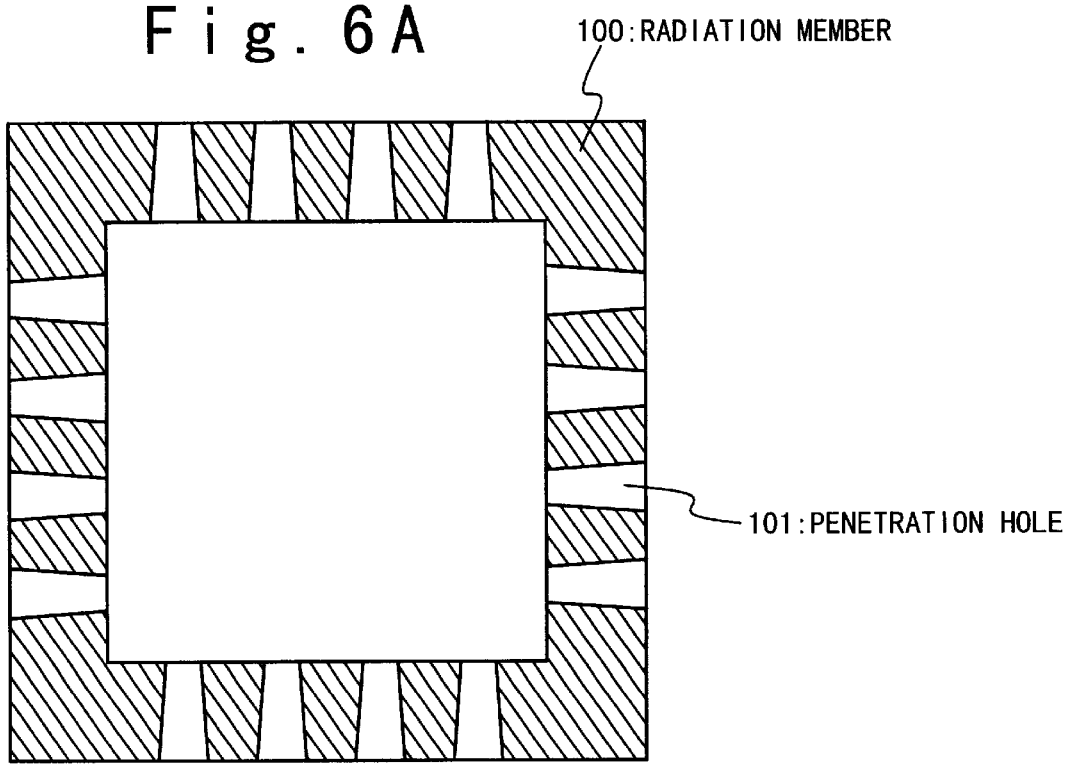
FIG. 6A is a section view showing a structure of a heat radiation member used in a liquid crystal display according to the first embodiment of the present invention.
Figure 6B:
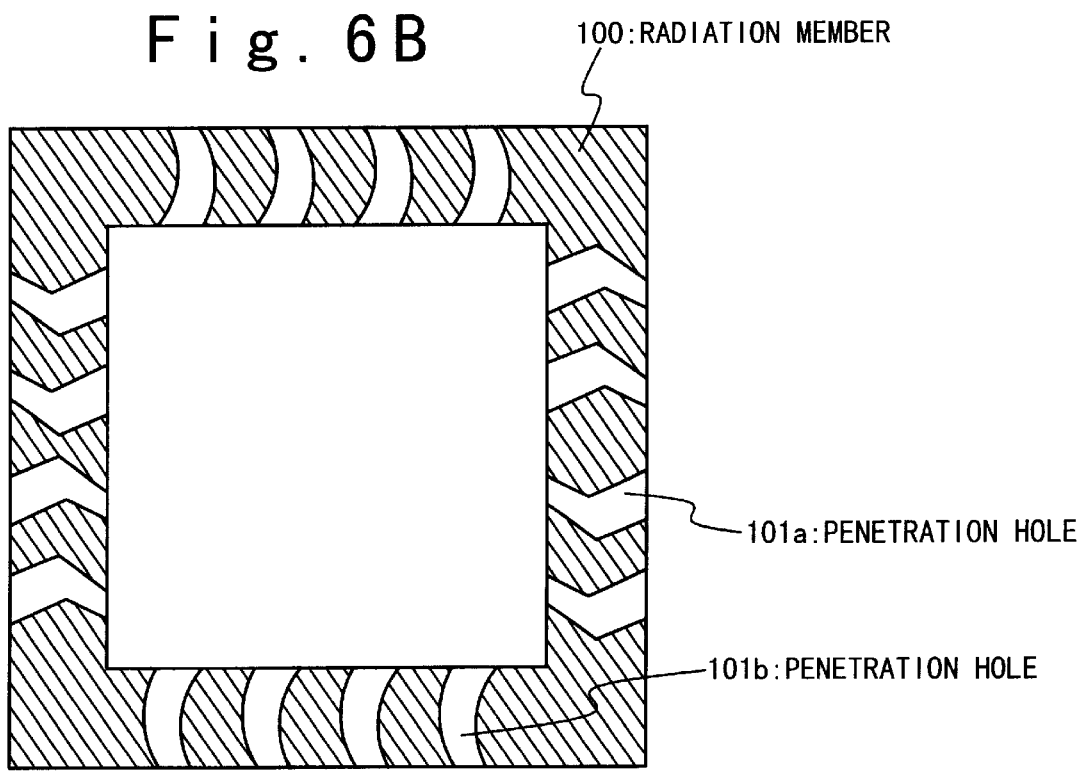
FIG. 6B is a section view showing a structure of another heat radiation member used in a liquid crystal display according to the first embodiment of the present invention.

The shapes of the penetration holes 101 and the grooves 102 will be described below with reference to FIGS. 6A and 6B showing the section view taken by cutting the heat radiation member 100 along a line B—B' of FIG. 5B.

As shown in FIG. 6A, a plurality of penetration holes 101 tapered so as to penetrate the inner circumference surface 100a and the outer circumference surface 100b are formed in the heat radiation member 100. In each of the penetration holes 101, the tapered formation direction is determined depending on a position of the penetration hole.

For example, if a direction of setting the liquid crystal display is determined, in the penetration hole 101 penetrating the inner circumference surface 100b and the outer circumference surface 100a at the lower portion of the heat radiation member 100, a diameter of a hole formed in the outer circumference surface 100b is set to be greater than a diameter of a hole formed in the inner circumference surface 100a. Similarly, in the penetration hole 101 penetrating the outer circumference surface 100b and the inner circumference surface 100a at the-upper portion of the heat radiation member 100, a diameter of a hole formed in the outer circumference surface 100b is set to be smaller than a diameter of a hole formed in the inner circumference surface 100a.

That is, the penetration holes 101 and the grooves 102 formed in an upper half portion of a side portion of the heat radiation member 100 and the penetration holes 101 and the grooves 102 formed in a lower half portion of the side portion of the heat radiation member 100 are different from each.other in the tapered formation direction.

In other word, the penetration holes 101 and the grooves 102 formed in the heat radiation member 100 are formed such that the air convection is generated as denoted by the bold arrow of FIG. 5B. Also, it is desirable that taper angles $\theta$ of the penetration hole 101 and the groove 102 are 30°.

In the heat radiation member used in the liquid crystal display according to the first embodiment of the present invention, bent penetration holes 101a and curved penetration holes 101b may be formed as shown in FIG. 6B. The formation of the heat radiation member having the above-mentioned shape enables the optical loss to the external portion of the light source device to be reduced without any drop in the heat radiation efficiency.

A configuration of the light source device used in the liquid crystal display according to the first embodiment of the present invention will be described below with reference to the drawings.

FIG. 7A is a section view showing a structure of the liquid crystal display 1 using the light source device having a straight fall type structure, according to the first embodiment of the present invention. As shown in FIG. 7A, the light source device 4 having the straight fall type structure is employed as the light source device opposite to the rear of the optical member 5, such as a diffusion plate and the like, through the air layer 110.

A light transmission plate 103 serving as an emission surface opposite to the rear of the optical member 5 is mounted in the light source device 4 so as to cover the lamp house 4a. The light transmission plate 103 does not have a diffusion function of the light from a light source 41. It is mounted so as to use the lamp house 4a as a closed space. So, it may be a device for sufficiently transmitting the light from the light source 41.

That is, the air layer 110 is formed since the light transmission plate 103 seals the lamp house 4a and further the heat radiation member 100 having the penetration holes 101 is put between the shield center 32 and the shield rear 33.

Thus, the inflow of the air resulting from the formation of the penetration holes 101 and the air layer 110 is generated in the penetration holes 101 and the air layer 110. This generation of the inflow can prevent the temperature rises in the optical member 5 and the liquid crystal panel 2 caused by the heat generated from the light source 41.

Also, the distance between the optical member 5 and the light source 41 mounted within the lamp house 4a is sufficiently reserved, which can reduce the occurrence of the irregular brightness that may be easily induced in using the light source device having the straight fall type structure.

FIG. 7B is a section view showing a liquid crystal display using a light source device having a side light type structure, which is used in the liquid crystal display according to the first embodiment of the present invention. As shown in FIG. 7B, a light source device 4 having the side light type structure is employed as the light source device opposite to a rear of an optical member 5, such as a diffusion plate and the like, through an air layer 110. This light source device 4 includes a light guide plate 42, a light source 41 mounted on one end surface of the light guide plate 42, and a reflector 43 mounted so as to cover the light source 41. The light source device 4 is put between a shield rear 33 and a heat radiation member 100, in which penetration holes 101 are formed.

Also, the heat radiation member 100 and the optical member 5 mounted on the surface side of the heat radiation member 100 are put between the shield rear 33 and the shield center 32.

The heat radiation member 100 has a substantial-frame-shape and an opening portion. The air layer 110 is formed by the opening portion, the light guide plate 42 and the optical member 5. The penetration hole 101 links the air layer 110 and the external portion to each other.

Moreover, on the surface side of the optical member 5, the liquid crystal panel 2 is put between the shield center 32 and the shield front 31. The shield front 31, the shield center 32 and the shield rear 33 are fixed by using screws and the like, and constitute a liquid crystal display 1.

Due to the above-mentioned configuration, the inflow of the air resulting from the formations of the penetration holes 101 and the air layer 110 is generated in the penetration holes 101 and the air layers 110. This generation of the inflow can prevent the temperature rises in the liquid crystal panel 2 and the optical member 5 caused by the heat generated from the light source 41.

Also, the gradation process in which the dot for adjusting the irregular brightness and the like are printed is performed on the light emission surface in the light guide plate 42, namely, a surface opposite to the rear of the liquid crystal panel 2.

The light source device used in the liquid crystal display according to the first embodiment of the present invention has a light emission surface of a substantially single surface. Thus, it is possible to use a light source device having a flat plane type of a light source (hereafter, referred to as a plane light source) in which two transparent substrates are overlapped with each other through seal material and the like, and rare gas, mercury vapor or the like is filled in the sealed space constituted by them.

FIG. 7C is a section view showing the structure of such a plane light source device. As shown in FIG. 7C, in the light source device 4 according to the first embodiment of the present invention, two transparent substrates composed of a scan side substrate 45 and a data side substrate 46 are opposite to each other through a sealing wall 44, such as a sealing material and the like, and one closed space is formed by the two transparent substrates and the sealing wall 44. The scan side substrate 45 is made of glass and the like. A plurality of electrodes 45a, 45b, a dielectric layer 45c formed so as to cover them, and a protection film 45d formed on a surface of the dielectric layer 45c are formed on a surface of the scan side substrate 45.

The data side substrate 46 is configured such that a dielectric layer 46a and a fluorescent material 46b are laminated on the rear thereof.

A closed discharging layer 47 is formed by calcining or sintering the scan side substrate 45 and the data side substrate 46 through the sealing wall 44.

The rare gas, the mercury vapor or the like is filled in the discharging layer 47. The discharging layer 47 carries out a function as the light source 41 by using the surface of the data side substrate 46 as the light emission surface when an electrical power is applied to the above-mentioned electrode 45a, 45b.

As the rear gas filled in the discharging layer 47, xenon gas may be used. The xenon gas filled in a light source of a scanner, a facsimile, a copier and the like has a bolting point of 108.13° C. and a melting point of −111.8° C. Thus, there is no temperature dependence under a normal environment (a temperature range) of a usage of the liquid crystal display.

However, the mercury vapor filled in the cold cathode tube has a vapor pressure at an ordinal temperature. Also, the vapor pressure is changed in conjunction with a change of a temperature. That is, it has temperature dependence.

Thus, as shown in FIG. 7D, in the liquid crystal display 1 using the light source device 4 having the discharging layer 47 in which the mercury vapor is filled, it is desirable to insert the light transmission plate 103 as the adiabatic material between the light source 41 and the air layer 110, similarly to the light source device 4 having the straight fall type structure.

The above-mentioned structure can protect the light source 41 from being excessively cooled. Also, it can suppress the temperature rise of the light emission target.

Second Embodiment

In a liquid crystal display according to a second embodiment of the present invention, a light source device and a heat radiation member can be molded and integrated into a single unit.

Figure 8A:
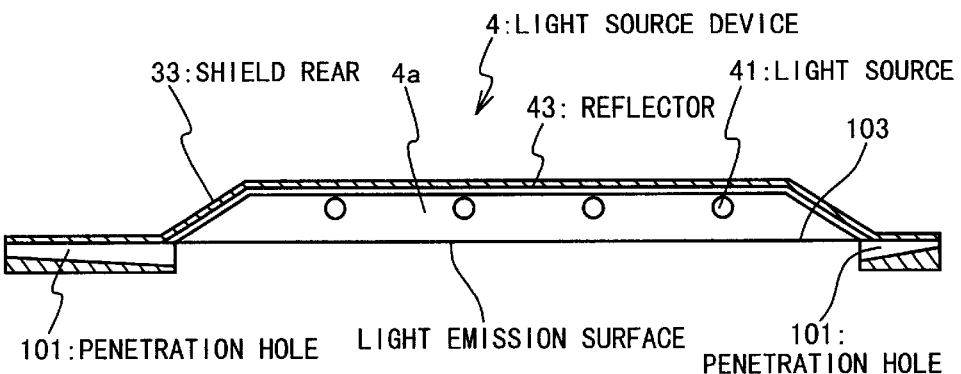
FIG. 8A is a section view showing a structure of a light source device having a straight fall type structure used in a liquid crystal display according to a second embodiment of the present invention.

FIG. 8A is a section view showing a light source device having a straight fall type structure used in a liquid crystal display according to the embodiment of the present invention.

As shown in FIG. 8A, a protrusion 33a protruding in a direction opposite to a formation direction of a lamp house 4a is formed in a region besides the lamp house 4a of a shield rear 33. A penetration hole 101 is formed in the protrusion 33a. The penetration hole 101 is tapered such that its sectional area becomes smaller towards external portion. A plurality of light sources 41 are mounted in the lamp house 4a through a reflector 43. Also, a light transmission plate 103 is mounted so as to cover the lamp house 4a.

The above-mentioned configuration enables the following function. That is, the light transmission plate 103, the inner surface of the protrusion 33a and an optical member (not shown) of the liquid crystal display constitute an air layer, and air flows through the penetration hole 101 into the air layer.

Figure 8B:
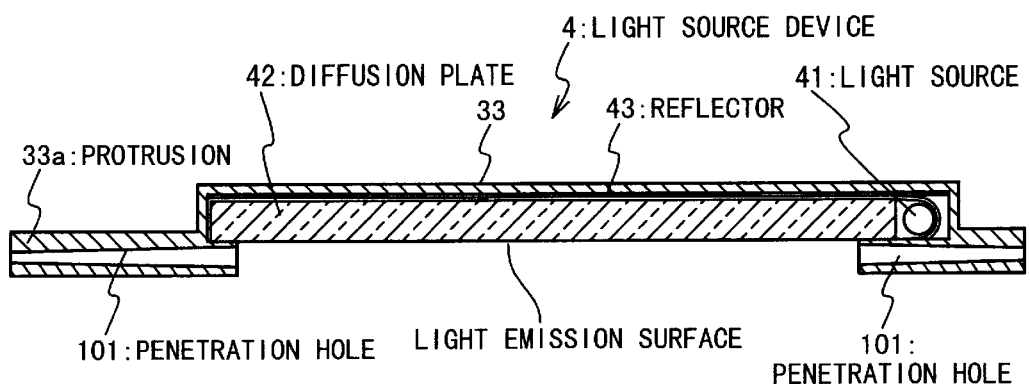
FIG. 8B is a section view showing a structure of a light source device having a side light type structure used in a liquid crystal display according to the second embodiment of the present invention.

FIG. 8B is a section view showing a structure having a light source device having a side light type structure used in the liquid crystal display according to the second embodiment of the present invention.

As shown in FIG. 8B, a protrusion 33a protruding in a direction in which a light guide plate 42 is mounted is formed at an edge portion of a shield rear 33 in which the light guide plate 42 is mounted in an inner surface through a reflector 43. Also, a penetration hole 101 is formed in the protrusion 33a. The penetration hole 101 is tapered such that a sectional area becomes smaller towards external portion.

Moreover, the gradation process is performed on a plane opposite to a light emission surface in the light guide plate 42, namely, a rear of the light guide plate 42 opposite to the shield rear 33 through a reflection plate 43. The gradation process performed on the rear of the light guide plate 42 by printing the dot and the like carries out a function similar to that of a diffusion plate for adjusting the irregular brightness.

In addition, a light source 41 is mounted on one end surface of the light guide plate 42. A reflector 43 is mounted so as.to cover such a light source 41.

The above-mentioned configuration enables the following function. That is, the light guide plate 42, the inner surface of the protrusion 33a and an optical member (not shown) of the liquid crystal display constitute an air layer, and air flows through the penetration hole 101 into the air layer.

As the liquid crystal display according to the second embodiment of the present invention and the light source device used therein, the light source device has been described as the configuration including the shield rear that is a part of the body of the liquid crystal display. However, it is not limited the above configuration if the light source device is composed of a single configuration.

Figure 8C:
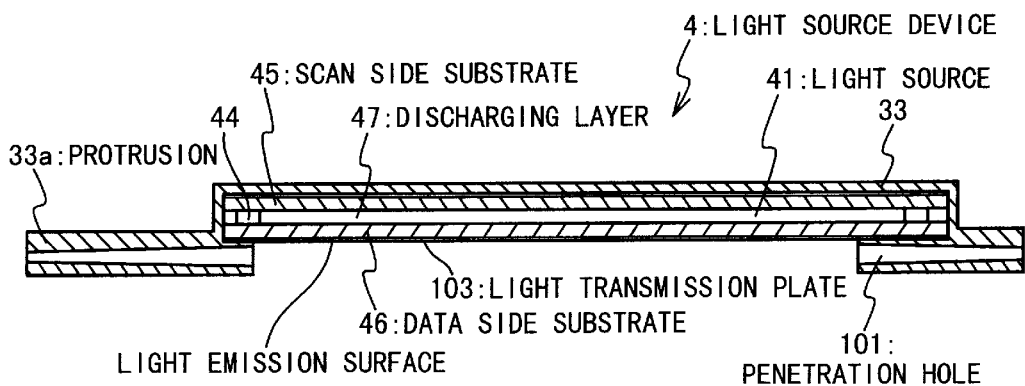
FIG. 8C is a section view showing a structure of a plane light source device used in the liquid crystal display according to the second embodiment of the present invention.

FIG. 8C is a section view showing a structure of a plane light source device used in the liquid crystal display according to the second embodiment of the present invention.

As shown in FIG. 8C, a protrusion 33a protruding in a direction in which a plane light source 41 is mounted is formed at an edge portion of a shield rear 33 in which the plane light source 41 and a light transmission plate 103 are mounted in an inner surface. That is, it is formed such that the plane light source 41 and the light transmission plate 103 are put between the shield rear 33 and the protrusion 33a.

The plane light source 41 is configured such that two transparent substrates composed of a scan side substrate 45 and a data side substrate 46 are opposite to each other through a sealing wall 44, such as a sealing material and the like, and one closed space (a discharging layer 47) is formed by the two transparent substrates and the sealing wall 44. The discharging layer 47 carries out a function as the light source 41 by using the surface of the data side substrate 46 as the light emission surface when the rare gas, the mercury vapor or the like is filled in the discharging layer 47, and an electrical power is applied to an electrode (not shown) formed in the scan electrode 45.

As mentioned above, also in the case of the liquid crystal display according to the second embodiment of the present invention, its structure is different depending on whether the gas filled in the discharging layer 47 is the gas of temperature dependence or the gas of temperature independence.

That is, if the gas having the property of the temperature dependence is filled in the discharging layer 47, it is necessary to put the light transmission plate 103 as the adiabatic material together with the plane light source 41 between the shield rear 33 and the protrusion 33a. However, if the gas having no temperature dependence is filled in the discharging layer, it may not be mounted except the purpose of properly keeping a distance between the plane light source 41 and the optical member 5 such as the diffusion plate and the like.

Also, a penetration hole 101 is formed in the protrusion 33a. The penetration hole 101 is tapered such that its sectional area becomes smaller towards external portion.

The above-mentioned configuration enables the following function. That is, the light transmission plate 103 or the light emission surface of the plane light source 41, the inner surface of the protrusion 33a and an optical member (not shown) of the liquid crystal display constitute an air layer, and air flows through the penetration hole 101 into the air layer.

As the liquid crystal display according to the second embodiment of the present invention and the light source device used therein, the light source device has been described as the configuration including the shield rear that is a part of the body of the liquid crystal display. However, it is not limited the above configuration if the light source device is composed of a single configuration.

EXAMPLE

As one example of the liquid crystal display according to the embodiments of the present invention, the configuration of the air layer formed in the liquid crystal display will be described below with reference to the attached drawings.

The air layer formed in the liquid crystal display according to the embodiments of the present invention is mounted in order to effectively radiate the heat generated from the light source device and thereby prevent the temperature rises in the liquid crystal panel and the optical member, such as the diffusion plate and the like.

That is, the air layer is a space mounted between the light emission surface of the light source device and the rear of the optical member. The heat radiation from the liquid crystal display can be effectively performed by properly holding a distance between the light emission surface of the light source device and the rear of the optical member.

Figure 9A:
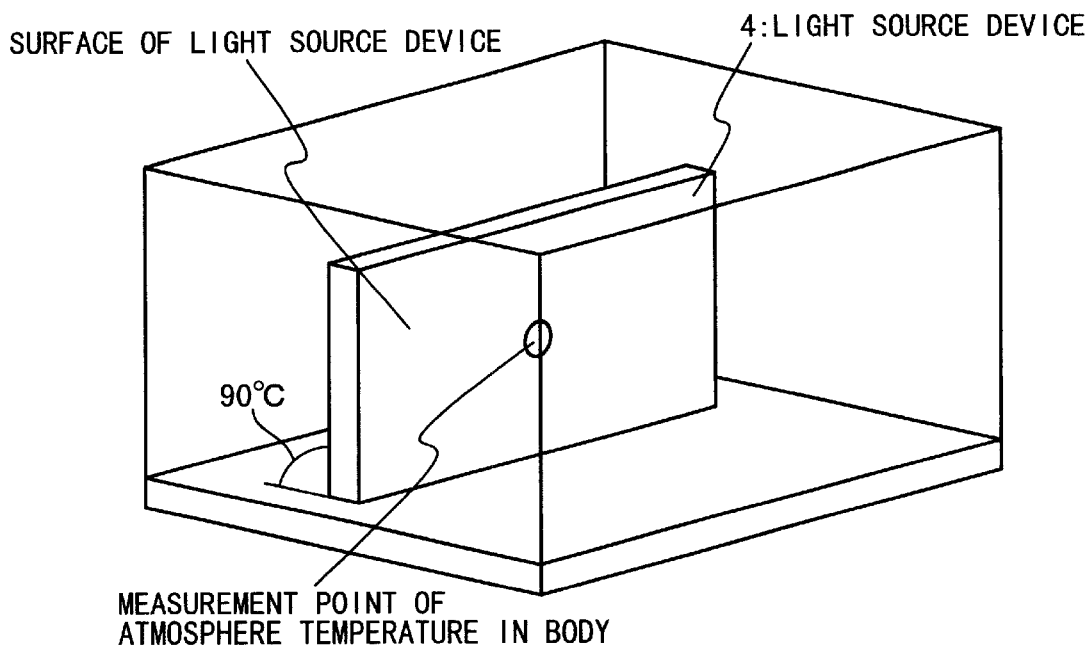
FIGS. 9A and 9B are views describing an example of a liquid crystal display according to the embodiments of the present invention.
Figure 9B:
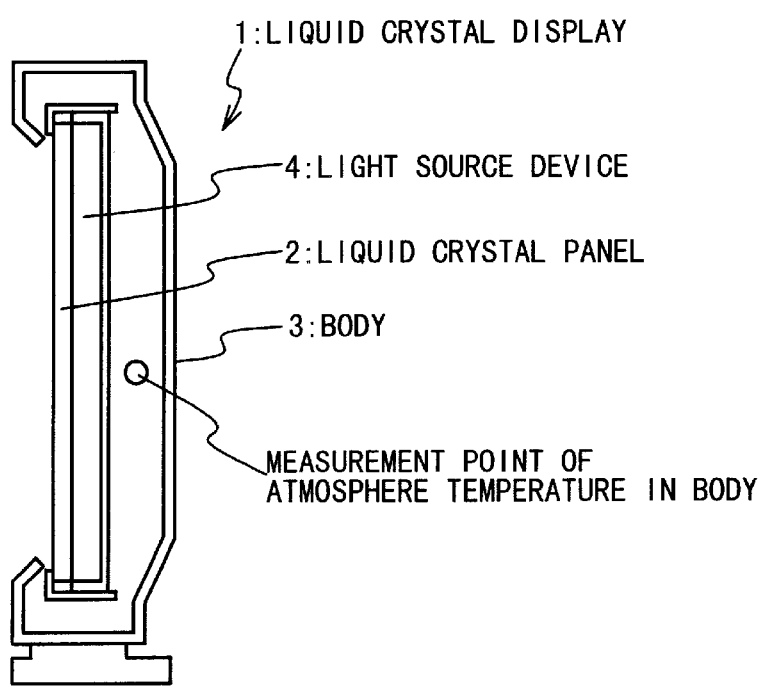
Figure 10:
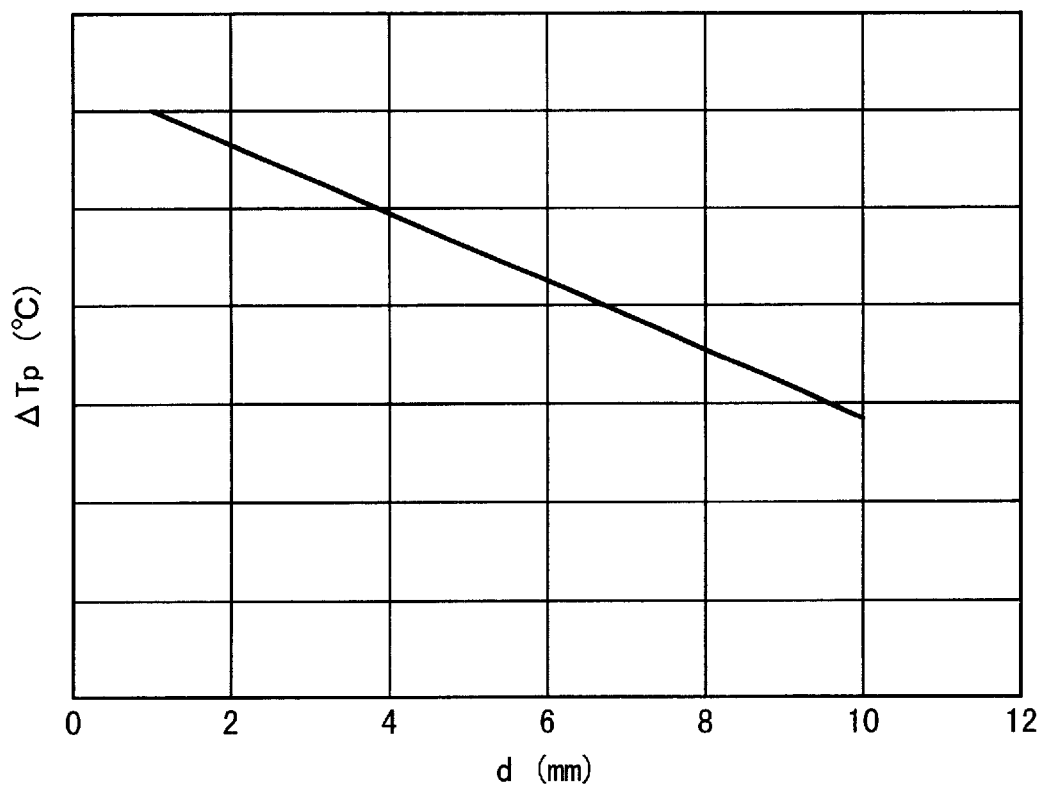
FIG. 10 is a graph showing a relation between a temperature rise with respect to an atmosphere temperature and a distance between a liquid crystal panel and a light emission surface of a light source device in the example of a liquid crystal display according to the embodiments of the present invention.

Thus, the inventor carried out the experiments shown in FIGS. 9A, 9B and FIG. 10, with regard to the relation between the above distance and the temperature rise in the body of the liquid crystal display.

As shown in FIG. 9A, after the light source device is mounted in an acrylic case, the light source device is turned on. In this state, let us suppose that an atmosphere temperature at a condition when a temperature in the acrylic case is saturated is Ta, a temperature on a central portion of a light emission surface of, the light source device at that time is Tp, and a temperature rise in the light source device to the atmosphere temperature in the acrylic case is ΔTp.

Above-mentioned condition is equal to the following condition substantively. That is, as shown in FIG. 9B, after the light source device is mounted in the body of the liquid crystal display, the light source device is turned on. In this state, let us suppose that an atmosphere temperature at a condition when the temperature in the body is saturated is Tb.

Here, if a light source device having ΔTp of 17° C. is used and a distance d (mm) between a light mission surface of the light source device and an optical member is assumed to be d=1, an allowable temperature rise value ΔTpmax of the light source device can be represent as follows:

ΔTpmax=(Allowable Temperature of Liquid Crystal Panel)−(Atmosphere Temperature in Body)−(Margin, Individual Sample Difference)

Typically, in the liquid crystal display, it is known that the atmosphere temperature in the body reaches about 35° C. in an actual usage state.

The liquid crystal panel is desired to be operated at 50° C. or less because its display function is dropped when its surface temperature becomes equal to or higher than a predetermined temperature.

Also, with regard to the optical member, it is known that its changing function and the like are dropped at a temperature equal to or higher than a predetermined temperature.

Thus, when the margin of the body, namely, the individual sample difference are set at 5° C. and it is applied to the above-mentioned equation, the following value is obtained:

$$\Delta Tp\text{max} = 50°\text{ C.} - 35°\text{ C.} - 5°\text{ C.} = 10°\text{ C.}$$

Therefore, ΔTpmax needs to be set at 10° C. or less.

FIG. 10 shows a graph of an actually measured result of ΔTp when the distance d between the light emission surface of the light source device and the optical member is varied. According to this graph, the equation of "$\Delta Tp \propto -1.614d$" is made obvious.

That is, if a light source device having ΔTp of 15° C. or more is used, the following equation can be used to determine the distance d between the light emission surface of the light source device and the optical member:

$$\Delta Tp - \Delta Tp\text{max} = 1.614(d - d0)$$

In order to satisfy this condition, when a light source device having ΔTp of 17° C. is used, distance d=4.33 . . . .

Thus, the influence caused by the heats from the light source device in the liquid crystal panel and the optical member can be sufficiently reduced by keeping the distance between the optical member and the light emission surface of the light source device at 4.3 mm or more.

Moreover, the liquid crystal display according to the second embodiment of the present invention and the light source device used therein can be diverted if it is the light source device having the straight fall type structure in which the light emission surface of the light source device is formed in the substantially single surface or it has the light emission surface opposite to the light emission target and the light emission surface is not the diffusion plate and the like.

As mentioned above, the heat from the light source device can be effectively radiated by the liquid crystal display according to the present invention and the light source device used in it to a degree that the functions of the liquid crystal panel and the optical member are not deteriorated.

Moreover, when the light source device having the straight fall type structure is used, the distance between the light source and the optical member, such as the diffusion plate and the like, can be sufficiently kept to thereby reduce the occurrence of the irregular brightness. Thus, the manufacturing cost and the number of assembling processes can be reduced by using the liquid crystal display according to the present invention and the light source device used therein.

What is claimed is:

1. A light source device having a straight fall type structure, comprising:

a light source;

a lamp house which houses said light source and has a light emission surface from which a light from said light source is emitted; and a protrusion which is arranged in a circumference edge portion on said light emission surface to have a frame structure, wherein said protrusion has an opening portion in a center and a penetration hole which extends in a parallel to said light emission surface to penetrate said protrusion.

2. The light source device according to claim 1, wherein a shape of said penetration hole is tapered.

3. The light source device according to claim 2, wherein the shape of said penetration hole is determined based on a flow route of air.

4. A light source device having a side light type structure, comprising:

a light source:

a light guide member through which a light form said light source is emitted; and a protrusion which is arranged in a circumference edge portion on said light guide member to have a frame structure, wherein said protrusion has an opening portion in a center and a penetration hole which extends in a parallel to said light guide member to penetrate said protrusion.

5. The light source device according to claim 4, wherein a shape of said penetration hole is tapered.

6. The light source device according to claim 5, wherein the shape of said penetration hole is determined based on a flow route of air.

* * * * *